United States Patent
Kim et al.

(10) Patent No.: US 7,289,048 B2
(45) Date of Patent: *Oct. 30, 2007

(54) DUO-BINARY ENCODER AND OPTICAL DUO-BINARY TRANSMISSION APPARATUS USING THE SAME

(75) Inventors: Sung-Kee Kim, Suwon-si (KR); Han-Lim Lee, Seoul (KR); Seong-Taek Hwang, Pyeongtaek-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 614 days.

This patent is subject to a terminal disclaimer.

(21) Appl. No.: 10/806,548

(22) Filed: Mar. 23, 2004

(65) Prior Publication Data

US 2005/0053384 A1 Mar. 10, 2005

(30) Foreign Application Priority Data

Sep. 8, 2003 (KR) .................. 10-2003-0062621

(51) Int. Cl.
*H03M 1/00* (2006.01)
(52) U.S. Cl. ...................... 341/111; 341/137
(58) Field of Classification Search ............. 341/111, 341/137, 50, 160, 110
See application file for complete search history.

(56) References Cited

U.S. PATENT DOCUMENTS

| | | | | | |
|---|---|---|---|---|---|
| 3,836,904 | A | * | 9/1974 | Cross | 341/70 |
| 4,618,941 | A | * | 10/1986 | Linder et al. | 708/319 |
| 5,124,979 | A | * | 6/1992 | Matui | 370/496 |
| 5,365,229 | A | * | 11/1994 | Gardner et al. | 340/855.4 |
| 5,451,953 | A | * | 9/1995 | Duffield | 341/176 |
| 6,842,125 | B2 | * | 1/2005 | Mauro et al. | 341/69 |
| 7,167,110 | B2 | * | 1/2007 | Noda | 341/57 |

* cited by examiner

*Primary Examiner*—Peguy JeanPierre
(74) *Attorney, Agent, or Firm*—Cha & Reiter, LLC

(57) ABSTRACT

A duo-binary encoder performs a parallel processing and an optical duo-binary transmission apparatus using the encoder to enhance transmission capability. The duo-binary encoder has a judgment unit for judging whether an odd number or even number of '0's exists in data input signals of N channels, a toggle unit for toggling an output signal of the judgment unit when a number of '0's is even, an intermediate signal generation unit for determining whether phases of other channels are shifted or not, according to an data input signal on the basis of a predetermined channel of the N channels. A phase division unit divides data into a first data group having non-shifted phases and a second group of data that require a phase shift, according to an output signal of the intermediate signal generation unit and the data input signal. The divided first and second data groups are then output.

17 Claims, 9 Drawing Sheets

DUO-BINARY ENCODER AND OPTICAL DUO-BINARY TRANSMISSION APPARATUS USING THE SAME

CLAIM OF PRIORITY

This application claims priority to an application entitled "Duo-binary encoder and optical duo-binary transmission apparatus using the same," filed in the Korean Intellectual Property Office on Sep. 8, 2003 and assigned Serial No. 2003-62621, the contents of which are hereby incorporated by reference.

BACKGROUND OF THE INVENTION

1. Field of the Invention

The present invention relates to an optical duo-binary transmission apparatus using an optical duo-binary transmission method . More particularly, the present invention relates to a duo-binary encoder performing a parallel processing and an optical duo-binary transmission apparatus using the same.

2. Description of the Related Art

In general, a Dense Wavelength Division Multiplexing (hereinafter, referred to as a DWDM) optical transmission system has an excellent communication efficiency, since it can transmit an optical signal having multiple channels with different wavelengths through a single optical fiber. Also, the DWDM system is capable of transmitting an optical signal regardless of transmission speed. Accordingly, the DWDM systems are now widely used in ultra-high speed internet networks, there are trends showing more and more data traffic being sent over such networks Recently, there are known systems in use that are capable of transmitting more than a hundred channels through a single optical fiber using the DWDM technology. Furthermore, various research is being actively conducted to develop a system that can transmit more than two hundred channels of 40 Gbps through a single optical fiber simultaneously, thus having a transmission speed of more than 10 Tbps.

However, one restriction to the enlargement of transmission capacity is due to severe interference and distortion between the channels. Such interference can be present when the channel distance is less than 50 GHz when a light intensity is modulated using the conventional non-return-to-zero (NRZ) method, which is due to a rapid increase of data traffic and a request for high-speed transmission of data of more than 40 Gbps. Transmission distance is also restricted in high-speed transmission of more than 10 Gbps since a direct current (DC) frequency component of a conventional binary NRZ transmission signal and a high frequency component spread during modulation cause non-linearity and dispersion when the binary NRZ transmission signal propagates in an optical fiber medium.

Recently, optical duo-binary technology has been gaining prominence as an optical transmission technology capable of overcoming the restrictions associated with transmission distance due to chromatic dispersion. One primary advantage of the duo-binary transmission versus other forms of DWDM transmission is that the transmission spectrum is reduced when compared with general binary transmissions.

In addition, in a dispersion restriction system, a transmission distance is inversely proportional to the square of the transmission spectrum bandwidth. For example, when the transmission spectrum is reduced by ½, the transmission distance increases four times. Furthermore, since a carrier frequency is suppressed in a duo-binary transmission spectrum, it is possible to relax the restriction of an optical power output caused by Brillouin scattering excited in the optical fiber.

FIG. 1 is a block diagram showing one construction of a conventional optical duo-binary transmission apparatus. Hereinafter, the conventional optical duo-binary transmission apparatus will be described with reference to FIG. 1.

In FIG. 1, the conventional optical duo-binary transmission apparatus includes a multiplexer 10, a precoder 20, a low pass filter 30, a modulator driving amplifier 40, a laser source 50 for outputting a carrier, and a Mach-Zehnder interferometer type optical intensity modulator 60. The multiplexer 10 multiplexes data input signals of N number of channels 1–N so as to output the multiplexed signal, and the precoder 20 encodes the multiplexed signal. The low pass filter 30 converts a two-level NRZ electrical signal output from the precoder 20 into a 3-level electrical signal, and reduces the bandwidth of the signal. The modulator-driving amplifier 40 amplifies the 3-level electrical signal so as to output an optical modulator-driving signal.

In typical operation, the input signals of N number of channels are multiplexed by the multiplexer 10, and the multiplexed signal is then encoded by the precoder 20. The 2-level binary signal output from the precoder 20 is input to the low pass filter 30, and the low pass filter 30 has a bandwidth corresponding to about ¼ of a clock frequency of the 2-level binary signal. This excessive limitation to the bandwidth causes interference between codes, which thus changes the 2-level binary signal to a 3-level duo-binary signal.

Further, the 3-level duo-binary signal is amplified by the modulator-driving amplifier 40 so as to be used as a driving signal of the Mach-Zehnder interferometer type optical intensity modulator 60. The carrier output from the laser source 50 is subject to phase and optical intensity modulation according to the driving signal of the Mach-Zehnder interferometer type optical intensity modulator 60 and is then output as a 2-level optical duo-binary signal.

FIG. 2 is a view showing a pattern and a phase shift of an output optical signal when a signal having a data sequence of 0011 0101 1110 1010 (35EA) is transmitted by means of the conventional optical duo-binary transmission apparatus shown in FIG. 1. In FIG. 2, whenever the data input signal becomes '0', the phase of the data input signal is shifted by $\pi$.

However, according to prior art devices as shown in FIG. 1, in generating the 3-level data signal by the electric low pass filter, a pseudo random bit sequence (hereinafter, referred to as a PRBS) has large influence. As the length of PRBS increases, a deterioration of transmission characteristics also increases, thereby causing much difficulty in realizing the system.

Furthermore, according to prior art devices as shown in FIG. 1, the input data are multiplexed, and the multiplexed data are then encoded by a precoder. Thus, the speed of the precoder must simultaneously increase as the transmission speed of the data increases. However, in a case of the conventional precoder, the structure includes san exclusive OR (XOR) gate and a time delay unit for delaying an output signal of the XOR gate by 1 data bit and feed backing the delayed signal. Therefore, when using high-speed data signals, it is difficult to operate a high-speed precoder due to time delay and limitation in speed of the XOR gate.

FIG. 3 is a block diagram showing another construction of a conventional optical duo-binary transmission apparatus. FIG. 4 shows output signals at points ①, ②, ③, ④, and ⑤ in FIG. 3.

In FIG. 3, the conventional optical duo-binary transmission apparatus includes a multiplexer 10, an encoder 70, a coupler or an adder 80, a modulator-driving amplifier 40, a laser source 50 for outputting a carrier, and a Mach-Zehnder interferometer type optical intensity modulator 60. The multiplexer 10 multiplexes data input signals of N number of channels so as to output the multiplexed signal, and the encoder 70 encodes the multiplexed signal so that the multiplexed signal includes phase information. The coupler 80 converts the encoded signal into a 3-level electrical signal, and the modulator-driving amplifier 40 amplifies the 3-level electrical signal so as to output an optical modulator-driving signal.

According to the conventional optical duo-binary transmission apparatus shown in FIG. 3, neither a low pass filter nor a precoder are used. Instead, in order to enable the apparatus to have a phase shift that is a main characteristic of an optical duo-binary signal, the encoder 70 outputs data ② having non-shifted phases and data ③ requiring a phase shift, from multiplexed data signals ① outputted from the multiplexer 10.

The output signals ② and ③ of the encoder 70 are converted into a 3-level signal ④ by the coupler 80, and the converted signal is passed through the optical intensity modulator 60 via the driving amplifier 40 and is then output as an optical duo-binary signal ⑤ with a phase shift.

Similar to the apparatus in FIG. 1, since the optical duo-binary transmission apparatus in FIG. 3 multiplexes the input signals of N number of channels and then encodes the multiplexed signal, the apparatus requires a high-speed encoder. However, it is difficult to realize such a high-speed encoder, due to limitations in speed of electrical components constituting the encoder.

SUMMARY OF THE INVENTION

Accordingly, the present invention provides a duo-binary encoder that can achieve a high speed even with existing low speed electrical elements, and an optical duo-binary transmission apparatus using the duo-binary encoder.

The present invention also provides an optical duo-binary transmission apparatus, which has transmission characteristics that are not affected by a Pseudo-Random bit sequence.

Furthermore, the present invention provides an optical duo-binary transmission apparatus that resists the problem of wavelength dispersion, without using neither an existing feedback type precoder nor an existing electrical low pass filter.

In order to accomplish the aforementioned items, according to the present invention, there is provided a duo-binary encoder comprising: a judgment unit for judging whether an odd number or even number of '0's exists in data input signals of N channels; a toggle unit for toggling an output signal of the judgment unit when a number of '0's is even; an intermediate signal generation unit for determining whether phases of other channels are shifted or not, according to an data input signal on the basis of a predetermined channel of the N channels; and a phase division unit for dividing data into a first data group having non-shifted phases and a second group of data which require a phase shift, according to an output signal of the intermediate signal generation unit and the data input signal, and outputting the divided first and second data groups.

According to an aspect of the present invention, there is provided an optical duo-binary transmission apparatus including:

an encoder for dividing N number of data input signals into a first data group having non-shifted phases and a second data group which require a phase shift by a parallel processing, and outputting the divided first and second data groups; a first/second multiplexer for multiplexing the first data group having non-shifted phases and the second data group that require a phase shift, respectively; a coupler for coupling signals respectively multiplexed by the first/second multiplexer so as to output a 3-level signal; a light source for generating and outputting an optical carrier; and an optical modulator for modulating the optical carrier into an optical duo-binary signal by the 3-level signal, and outputting the modulated signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Figure 1:
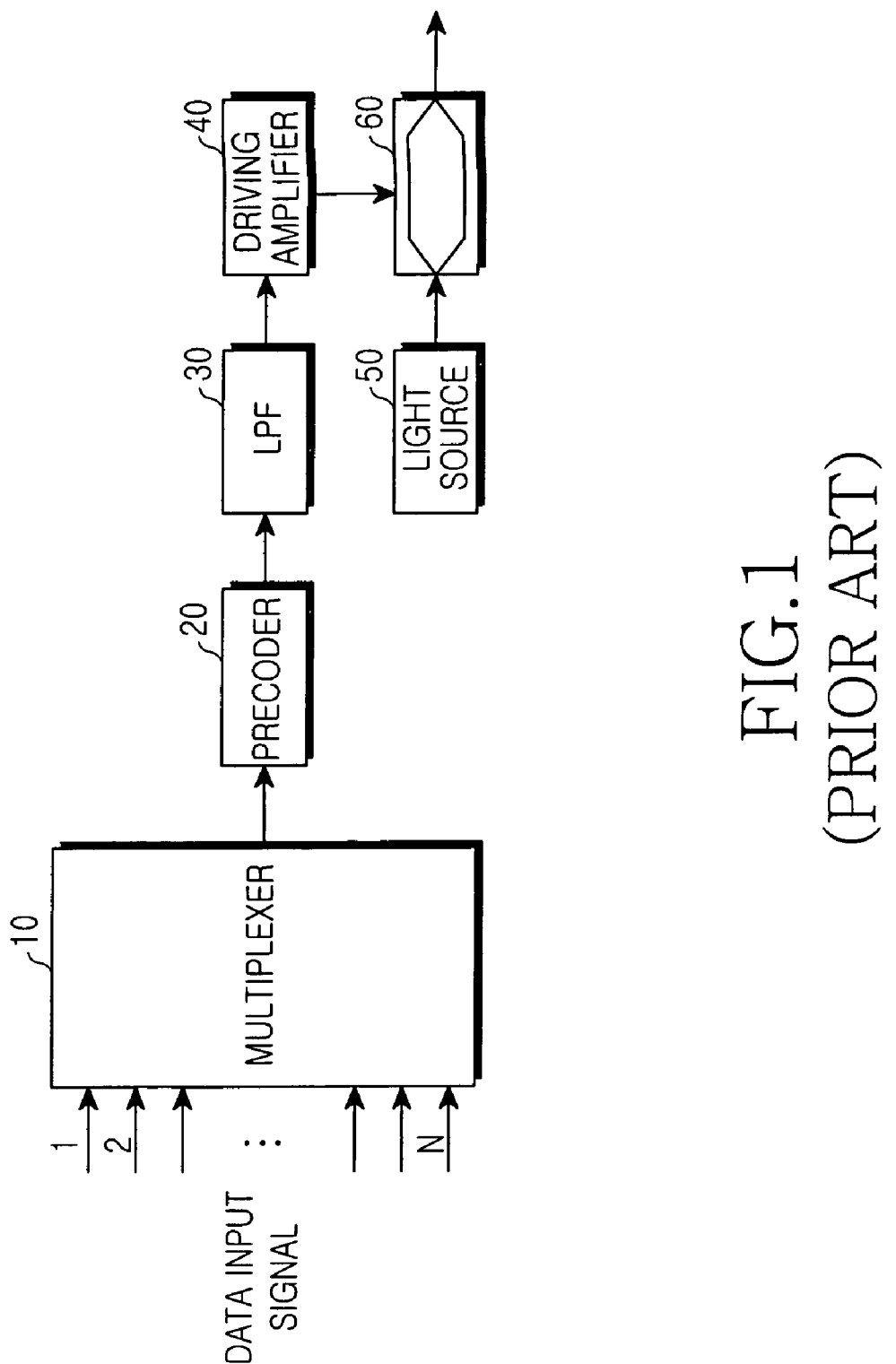
FIG. 1 is a block diagram showing one construction of a conventional optical duo-binary transmission apparatus.
Figure 2:
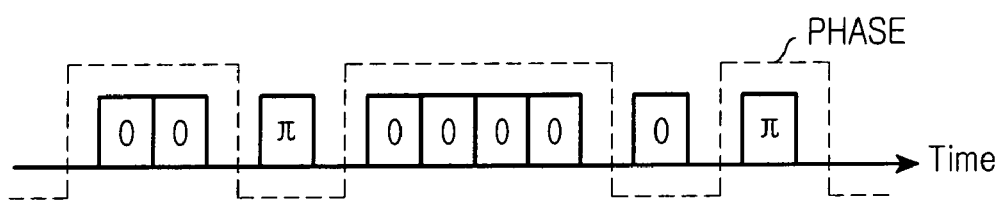
FIG. 2 is a view showing an example of an output signal obtained by using the optical duo-binary transmission apparatus in FIG. 1.
Figure 3:
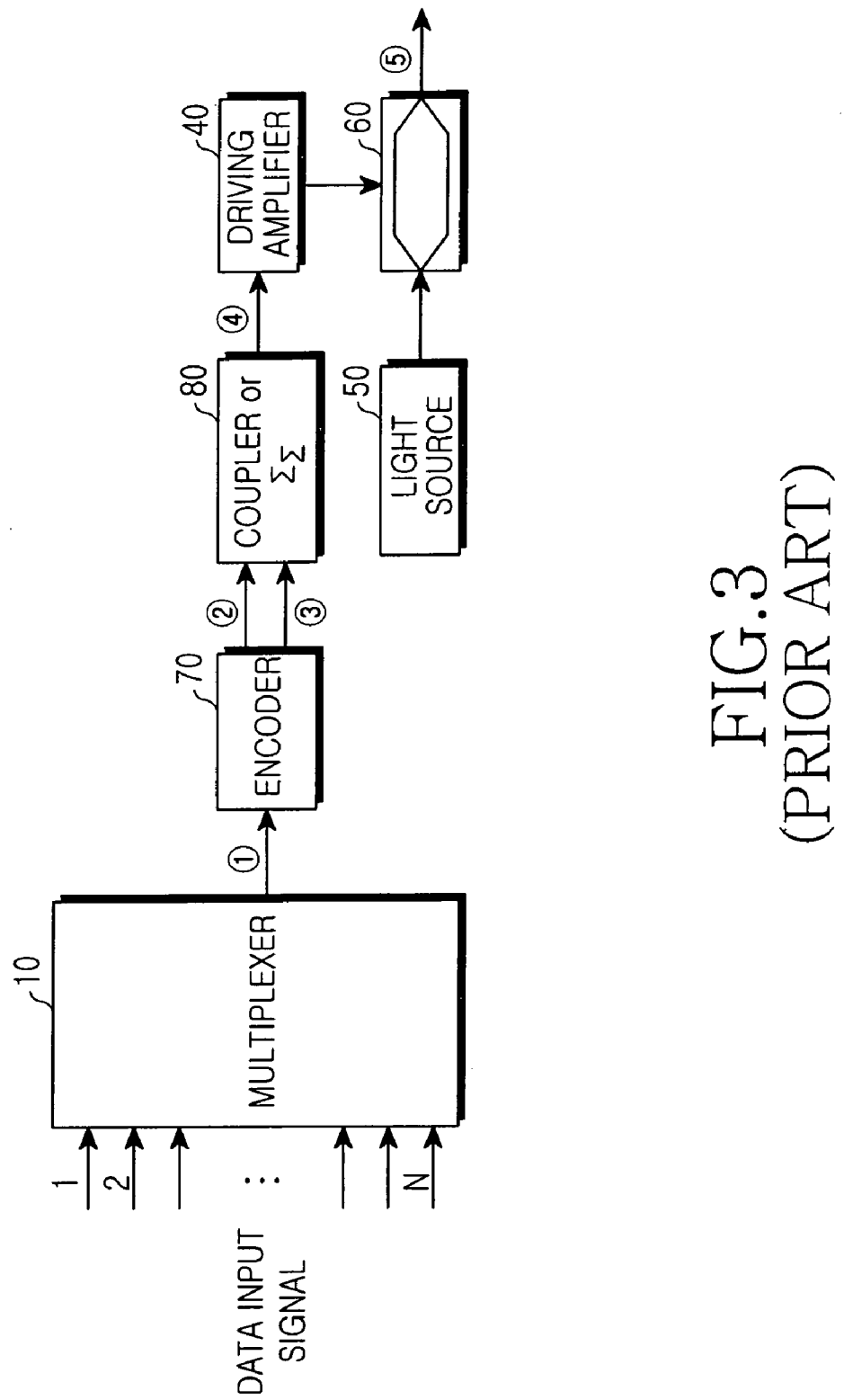
FIG. 3 is a block diagram showing another construction of a conventional optical duo-binary transmission apparatus.

Hereinafter, the present invention will be described with reference to the accompanying drawings. The same reference numerals are used to designate the same elements as those shown in other drawings. In the following description of the present invention, a detailed description of known functions and configuration incorporated herein will be omitted when it may make the subject matter of the present invention rather unclear.

Figure 5:
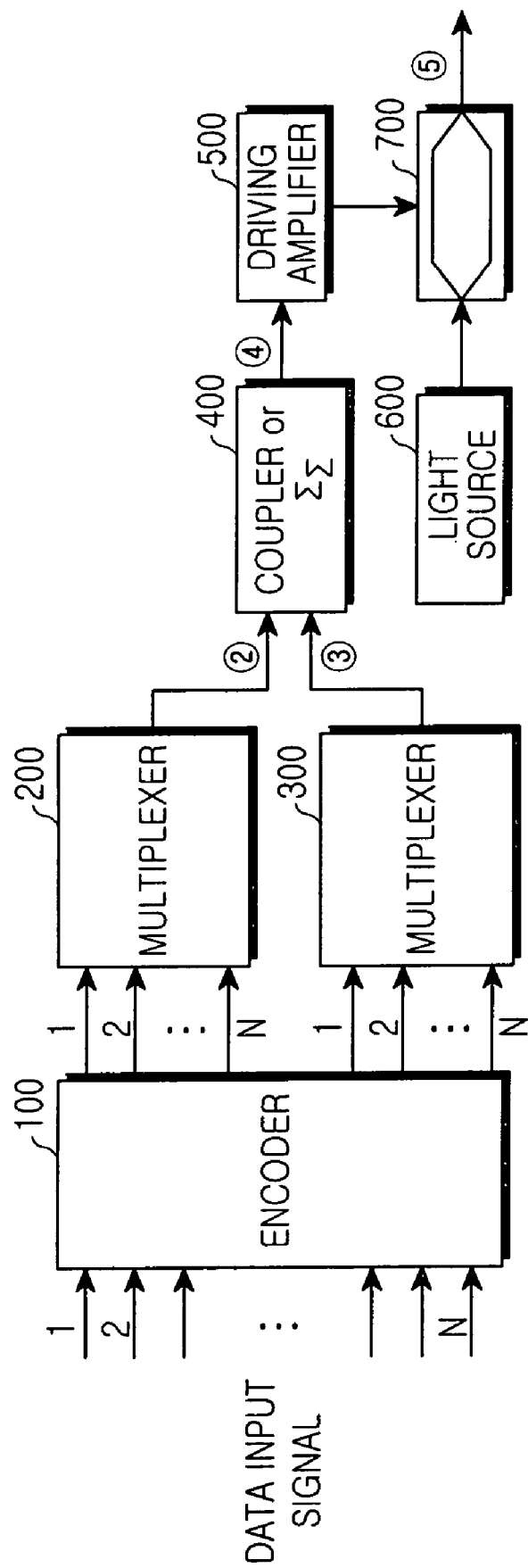
FIG. 5 is a block diagram showing a construction of an optical duo-binary transmission apparatus according to a first aspect of the present invention.

FIG. 5 is a block diagram showing a construction of an optical duo-binary transmission apparatus according to a first aspect of the present invention. In FIG. 5, the optical duo-binary transmission apparatus according to the present invention includes an encoder 100, first and second multiplexers 200 and 300, a coupler or an adder 400, a driving amplifier 500, a laser source 600 for outputting a carrier, and a Mach-Zehnder interferometer type optical intensity modulator 700. The encoder 100 encodes N number of data input signals, and the first and the second multiplexers 200 and 300 multiplex the encoded signals. The coupler 400 couples signals outputted from the first and the second multiplexers 200 and 300, and the driving amplifier 500 amplifies an output signal of the coupler 400.

The encoder 100 encodes data input signals of the N number of channels by a parallel processing.

Figure 6:
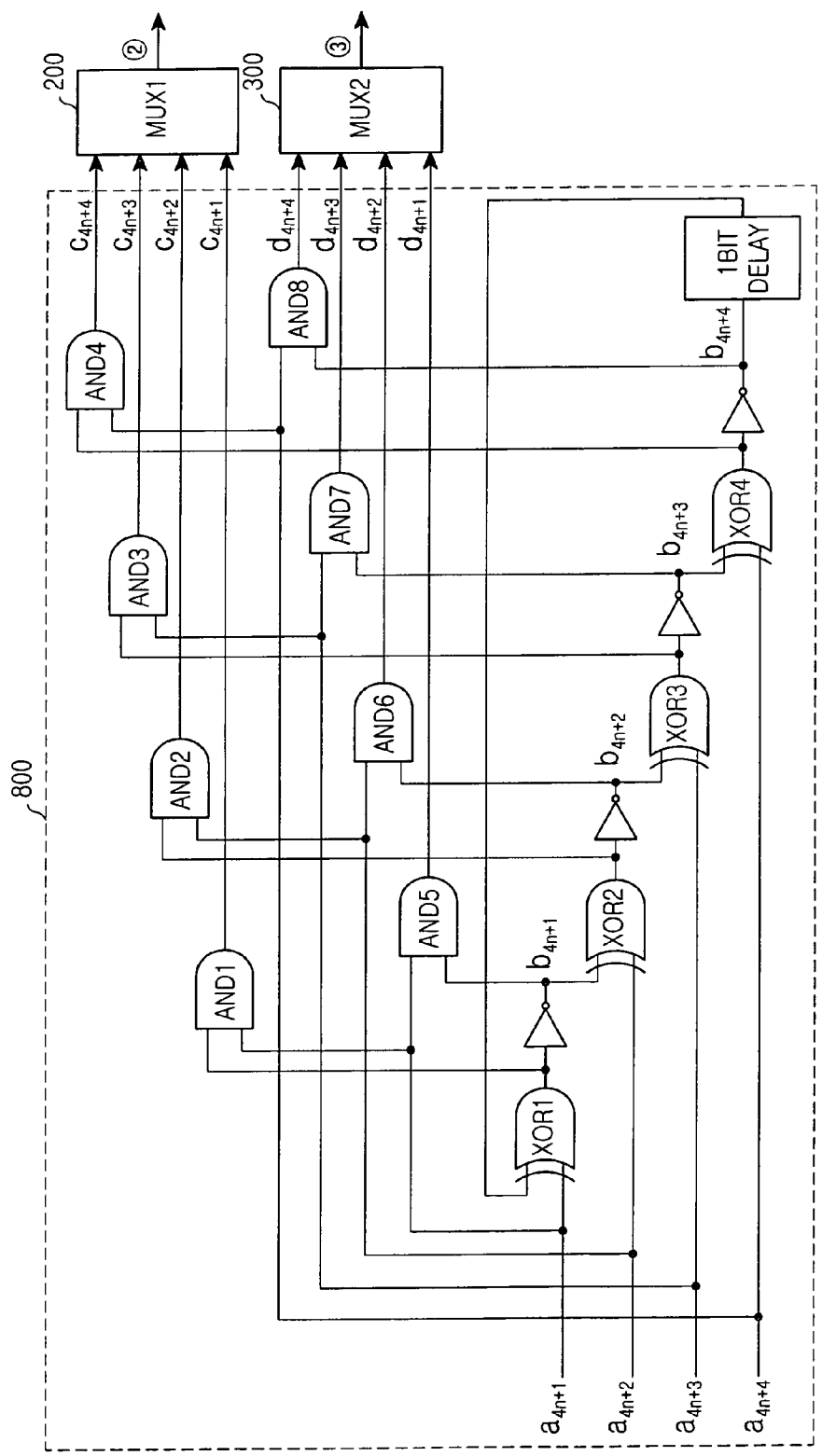
FIG. 6 is a view showing a construction of a duo-binary encoder performing a parallel processing according to the present invention.

FIG. 6 is a view showing a construction of a duo-binary encoder 800 performing a parallel processing according to a first aspect of the present invention, representing a case in which the number of input channels to be multiplexed is 4 (4n+1 to 4n+4). It can be seen in FIG. 6 that the first and the second multiplexers 200 and 300 are the same as those in FIG. 5, to which the output signals of the encoder 100 are inputted.

Referring to FIG. 6, when input signals are $a_{4n+1}$, $a_{4n+2}$, $a_{4n+3}$, and $a_{4n+4}$, a signal '$b_{4n+1}$' can be obtained by XORing the signal '$a_{4n+1}$' and a signal, which is achieved by time-delaying the signal '$b_{4n+4}$' by 1 data bit, and then inverting the XORed signal by means of an inverter. A signal '$b_{4n+2}$' can be obtained by XORing the signal '$b_{4n+1}$' and the signal '$a_{4n+2}$' and then inverting the XORed signal by means of an inverter. Signals '$b_{4n+3}$' and '$b_{4n+4}$' can be obtained in the same manner as described above. Therefore, the following logics are performed:

$$b_{4n+1} = \sim(a_{4n+1} \oplus b_{4(n-1)+4}) = \sim(a_{4n+1} \oplus b_{4n})$$

$$b_{4n+2} = \sim(a_{4n+2} \oplus \sim(a_{4n+1} \oplus b_{4n})) = \sim(a_{4n+2} \oplus b_{4n+1})$$

$$b_{4n+3} = \sim(a_{4n+3} \oplus \sim(a_{4n+2} \oplus b_{4n}))) = \sim(a_{4n+3} \oplus b_{4n+2})$$

$$b_{4n+4} = \sim(a_{4n+4} \oplus \sim(a_{4n+3} \oplus \sim(a_{4n+2} \oplus \sim(a_{4n+1} \oplus b_{4n})))) = \sim(a_{4n+4} \oplus b_{4n+3})$$

In the logics, each signal '$b_n$' is a signal for toggling the input signal whenever the input signal becomes '0'. In converting the input signals $a_n$ to optical duo-binary signals, the signals '$b_n$' are used in dividing the optical duo-binary signals into signals having non-shifted phases and signals having 180°-shifted phases. That is, the signals '$b_n$' and the input signals '$a_n$' can be ANDed to finally obtain signals '$c_n$' and '$d_n$'.

In FIG. 6, a d-flipflop (D-FF) can be used for delaying time by 1 data bit, and another XOR gate can be inserted into a path in which an XOR gate is not used for compensating for time delay at the XOR gate. In this case, the time delay can be compensated for without variation of the signal by inputting a "0" level signal to one input of the XOR gate.

Figure 4:
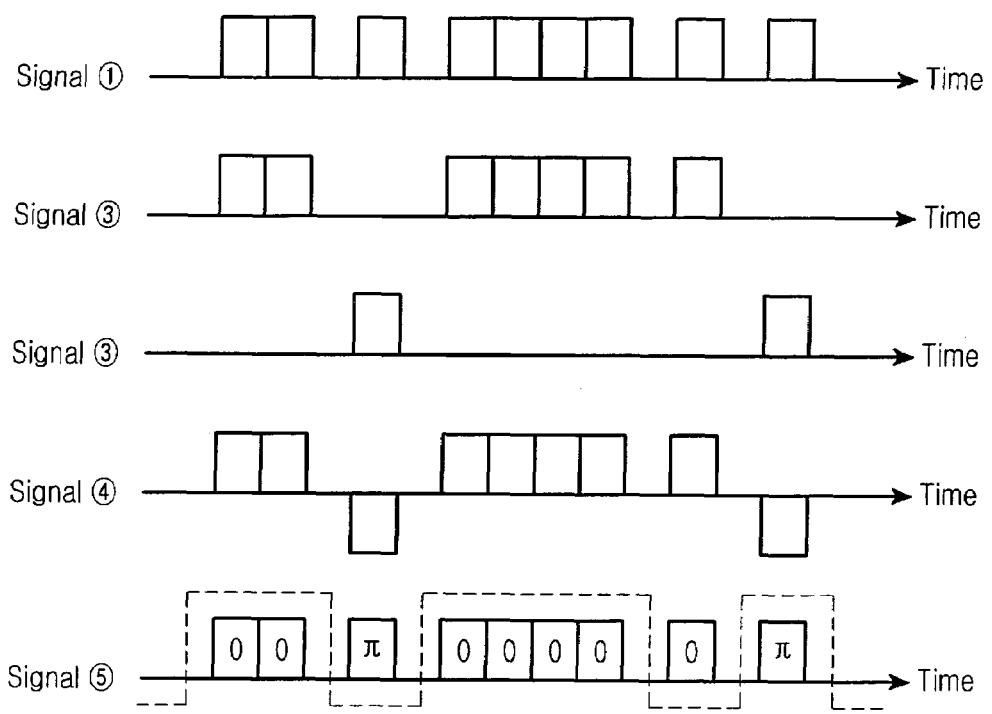
FIG. 4 is a view showing output signals at points ①, ②, ③, ④, and ⑤ in FIG. 3.

Referring to FIGS. 5 and 6, when the signals '$c_n$' and '$d_n$' obtained through the parallel processing are time-multiplexed by means of the first and the second multiplexers 200 and 300 respectively, the multiplexed signals are divided into data having non-shifted phases and data requiring a phase shift of 180°, respectively, similar to the signals ② and ③ in FIG. 4.

The signals ② and ③ having different phases are converted into a 3-level signal ④ by the coupler 400, and the 3-level signal ④ is amplified by the driving amplifier 500. As a result, the amplified signal is used as a driving signal of the Mach-Zehnder interferometer type optical intensity modulator 700.

Referring back to FIG. 5, the carrier output from the laser source 600 is phase-modulated and intensity-modulated according to the driving signal of the Mach-Zehnder interferometer type optical intensity modulator 700 and is then outputted as a 2-level optical duo-binary signal ⑤.

Figure 7:
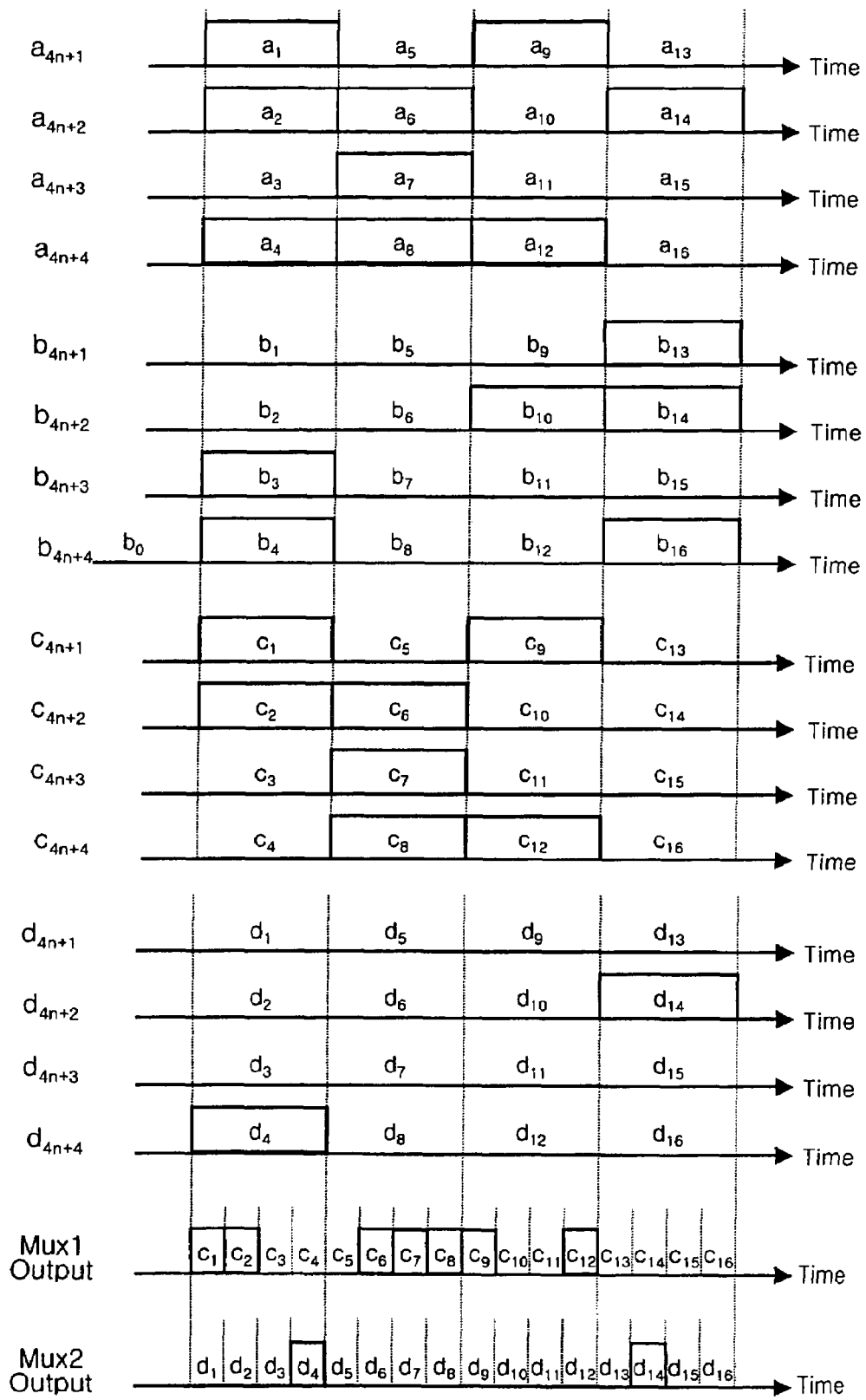
FIG. 7 is a view showing an example of input/output signals in FIG. 6.

FIG. 7 illustrates the input/output signals in FIG. 6 when an input signal is '1101011110010100'. In FIG. 7, if the input signals $a_{4n+1}$ to $a_{4n+4}$ are time-multiplexed, the multiplexed signal is equal to the input signal in FIG. 4. If the signals '$c_n$' and '$d_n$' obtained through the parallel processing are respectively time-multiplexed, the multiplexed signals are equal to the two output signals ② and ③ in FIG. 4. That is, coding can be performed in the same manner as shown in FIG. 6.

According to the first aspect of the invention, the duo-binary encoder 800 can be easily realized. However, as the number 'n' of the input signals increases, the time delay occurring at the XOR gate is accumulated. Therefore, time delay longer than 1 data bit may occur. Accordingly, the first aspect of the invention is more effective when the number of the input signals is small.

Such a limitation of the number of the input signals is caused by existence of a feedback from the last XOR gate. If the feedback does not exist, the number of the input signals is not limited. Furthermore, a number of inputs are simultaneously processed, so that a desired signal can be generated even with a low speed element.

Figure 8:
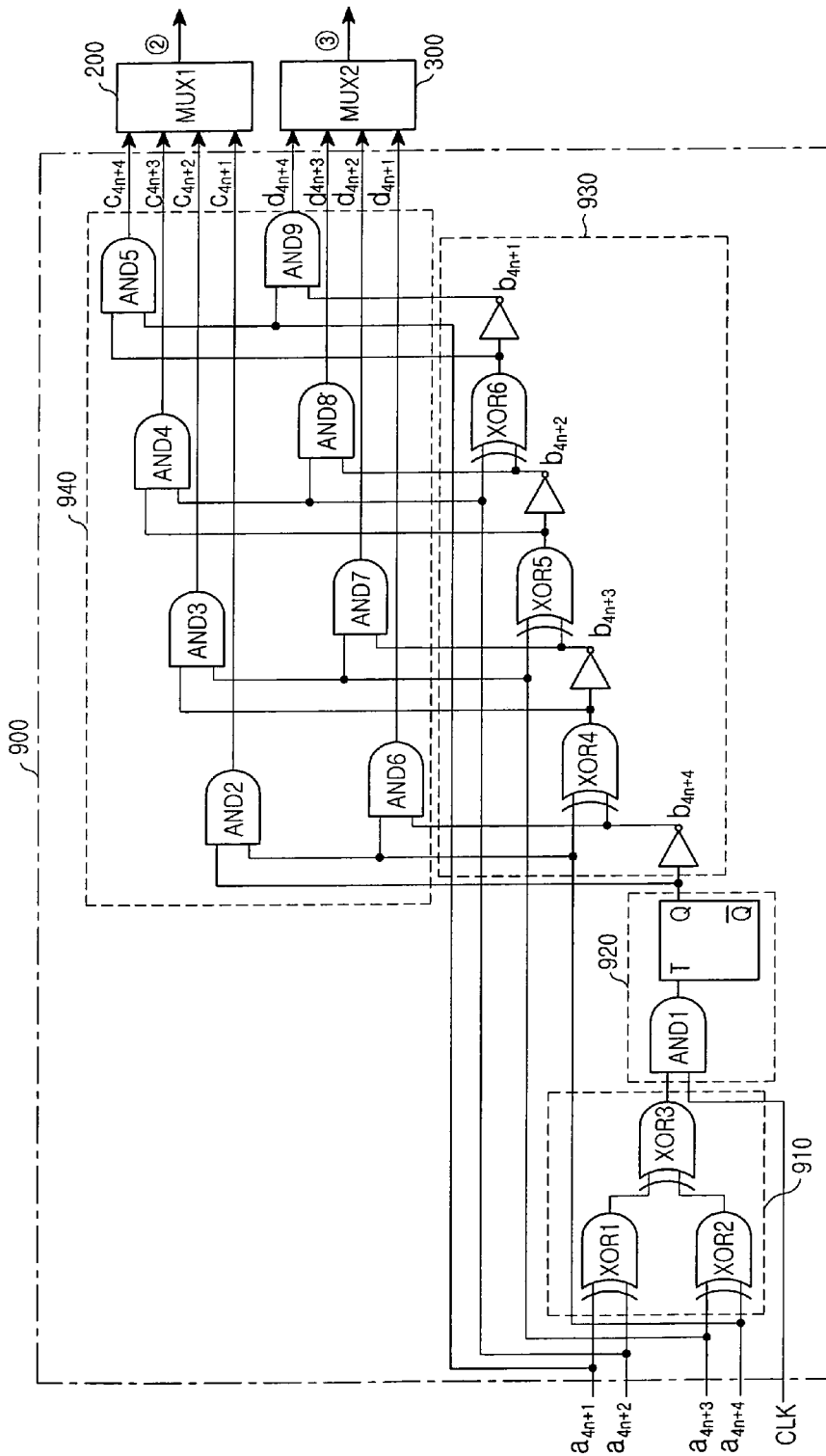
FIG. 8 is a view showing a construction of a duo-binary encoder performing a parallel processing according to a second aspect of the present invention.
Figure 9:
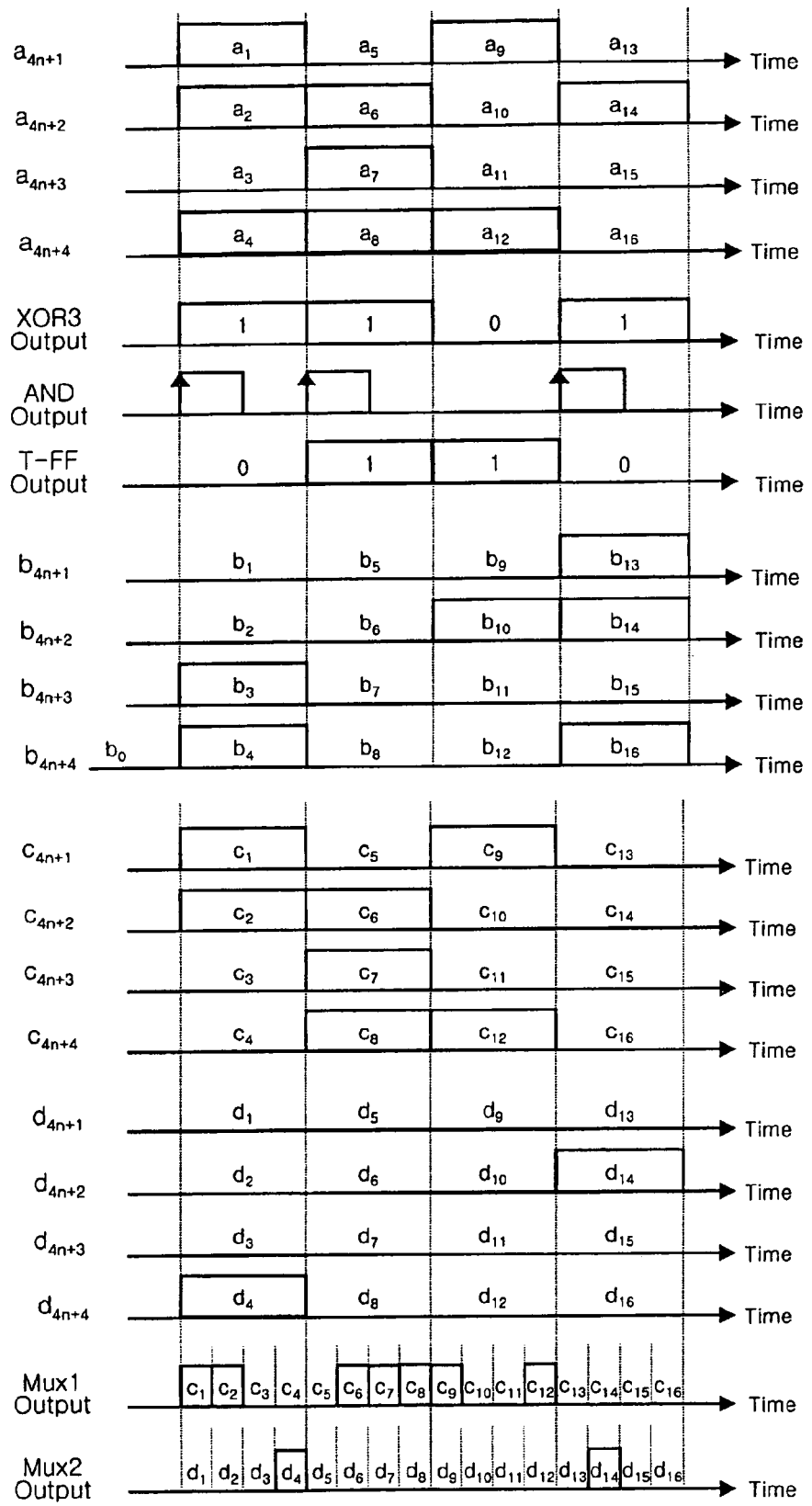
FIG. 9 is a view showing an example of input/output signals in FIG. 8.

FIG. 8 is a view showing a construction of a duo-binary encoder performing a parallel processing according to a second aspect of the present invention, and FIG. 9 is a view showing an example of the input/output signals in FIG. 8.

According to a duo-binary encoder of the type shown in FIG. 8, a feed-forward method is used, so that the number of input signals is not limited. For convenience of description, a description for an example in which the number N of input signals is 4 will be described below.

Referring to FIG. 8, the duo-binary encoder 900 includes a judgment unit 910, a toggle unit 920, an intermediate signal generation unit 930, a phase division unit 940, and a clock signal CLK.

Referring to FIGS. 8 and 9, the judgment unit 910 judges whether an odd number or even number of '0's exists in N number of input signals. For instance, when the number N of the input signal is even, the judgment unit 910 outputs '0' or '1' according as the total number of '0's in the N number of input signals is even or odd. FIG. 9 shows an example of the signals as described above. The judgment unit 910 has a construction in which XOR gates are connected to each other in a pyramid type. If the number of the input signals increases, the number of the XOR gates also increases. When the number N of the input signal is 4, the judgment unit 910 includes three XOR gates, that is, XOR1, XOR2, and XOR3.

When an output signal of the judgment unit 910 is '0' (i.e. when the number of '0's in the input signals is even), the toggle unit 920 toggles the output signal of the judgment unit 910. The toggle unit 920 includes an AND gate AND1 and a toggle flip-flop (hereinafter, referred to as a T-FF) and ANDs the output signal of the judgment unit 910 and the clock signal CLK. Further, the toggle unit 920 enables the ANDed signal to pass through the T-FF, while generating the nth output signal $b_{4n+4}$. Then, the signal obtained by ANDing the output signal of the judgment unit 910 and the clock signal CLK is input to the T-FF, and a toggle of the inputted signal occurs at each rising edge (marked by an arrow in FIG. 9) of the inputted signal.

The intermediate signal generation unit 930 determines phases of other channels according to input signals $a_n$, on the basis of the nth output signal $b_{4n+4}$ from among N number of channels, which includes several XOR gates (i.e. XOR4, XOR5, and XOR6) and inverters.

When intermediate signals $b_{4n+1}$ to $b_{4n+4}$, which are generated by the intermediate signal generation unit 930, and the input signals are converted to optical duo-binary signals, the phase division unit 940 divides the optical duo-binary signals into signals having non-shifted phases and signals having 180°-shifted phases. The phase division unit 940 can be achieved by a plurality of AND gates AND 2 to AND 9.

When output signals $c_n$ and $b_n$, which are obtained through the above-mentioned steps, are respectively time-multiplexed by means of multiplexers 200 and 300, the output signals (i.e. Mux 1 Output and Mux 2 Output) as shown in FIG. 9 can be obtained. Furthermore, the output signals are equal to the output signals Signal ② and Signal ③ in FIG. 4.

According to a duo-binary encoder of the type shown in FIG. 8, in order to compensate for time delay occurring when a signal passes through an XOR gate, another XOR gate in which '0' is applied to one input can be inserted into the duo-binary encoder, similarly to the duo-binary encoder of the first embodiment.

Furthermore, in order to compensate for time delay at an AND gate, another AND gate having one input to which '1' is inputted can be inserted into the duo-binary encoder. Furthermore, in order to compensate for time delay due to a T-FF, a D-FF can be used for compensating for the time delay.

According to a duo-binary encoder of the present invention as described above, coding is performed through a parallel processing before a time-multiplexing is performed. Therefore, a bottleneck due to high speed data can be prevented from occurring even with the existing low speed electrical element.

Further, the existing feedback type encoder is not used, so that the number of input signals is not limited.

According to the present invention, when an optical duo-binary transmission apparatus is achieved by means of a duo-binary encoder, a high speed precoder is unnecessary. Furthermore, a duo-binary encoder according to the present invention outputs a duo-binary signal with an inverse phase characteristic, without employing an electrical low pass filter, thereby removing an affection due to a Pseudo-Random bit sequence (PRBS).

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A duo-binary encoder comprising:
    a judgment unit for judging whether an odd or even number of '0's exists in data input signals of N channels;
    a toggle unit for toggling an output signal of the judgment unit when a number of '0's is even;
    an intermediate signal generation unit for determining whether phases of channels other than the N channels are shifted or not, according to an data input signal on the basis of a predetermined channel of the N channels; and
    a phase division unit for dividing data into a first data group having non-shifted phases and a second group of data that require a phase shift, according to an output signal of the intermediate signal generation unit and the data input signal, and outputting the divided first and second data groups.

2. The duo-binary encoder as claimed in claim 1, wherein the judgment unit includes a plurality of exclusive OR (XOR) gates connected to each other in a pyramid arrangement, so that the judgment unit outputs '0' or '1' when a total number of '0's in data input signals of the N channels is even.

3. The duo-binary encoder as claimed in claim 1, wherein the toggle unit comprises:
    an AND gate for ANDing the output signal of the judgment unit and a clock signal; and
    a T-FF for toggling an output signal of the AND gate at each rising edge of the output signal of the AND gate.

4. The duo-binary encoder as claimed in claim 1, wherein the intermediate signal generation unit inverts an output signal of the toggle unit to exclusive or (XOR) the data input signal and the inverted output signal, and then XORs the XORed signal and the data input signal again.

5. The duo-binary encoder as claimed in claim 1, wherein the phase division unit includes 2N number of AND gates so as to AND N number of intermediate signals, which are generated by the intermediate signal generation unit, and the N number of data input signals.

6. A duo-binary encoder comprising:
    N number of XOR gates for respectively receiving data signals $a_{Nn+1}$ to $a_{Nn+N}$;
    N number of inverters connected to output terminals of the XOR gates;
    N number of a first AND gates for respectively ANDing the data signals $a_{Nn+1}$ to $a_{Nn+N}$ and output signals of the N number of XOR gates;
    N number of a second AND gates for respectively ANDing the data signals $a_{Nn+1}$ to $a_{Nn+N}$ and output signals of the N number of inverters; and
    a delayer connected to an output terminal of a nth inverter, wherein an output signal of the delayer is fed back to the XOR gate to which the data signal $a_{Nn+1}$ is input.

7. The duo-binary encoder as claimed in claim 6, wherein the N number of the first AND gates and the N number of the second AND gates divide the data signals $a_{Nn+1}$ to $a_{Nn+N}$ into a first signal group having non-shifted phases and a second signal group that requires a phase shift, respectively.

8. The duo-binary encoder as claimed in claim 6, wherein the N comprises 4.

9. An optical duo-binary transmission apparatus comprising:
    an encoder for dividing N number of data input signals into a first data group having non-shifted phases and a second data group that require a phase shift, by a parallel processing, and outputting the divided first and second data groups;
    a first/second multiplexer for multiplexing the first data group having non-shifted phases and the second data group that require a phase shift, respectively;
    a coupler for coupling signals respectively multiplexed by the first/second multiplexer so as to output a 3-level signal;
    a light source for generating and outputting an optical carrier; and
    an optical modulator for modulating the optical carrier into an optical duo-binary signal by the 3-level signal, and outputting the modulated signal.

10. The optical duo-binary transmission apparatus as claimed in claim 9, wherein the encoder comprises:
    a judgment unit for judging whether an odd number or even number of '0's exists in N number of data input signals;
    a toggle unit for toggling an output signal of the judgment unit when a number of '0's is even;
    an intermediate signal generation unit for determining whether phases of other channels are shifted or not on the basis of a predetermined data input signal of the N number of data input signals; and a phase division unit for dividing data into a first data group having non-shifted phases and a second group of data that require a phase shift, according to an output signal of the intermediate signal generation unit and the data input signal, and outputting the divided first and second data groups.

11. The optical duo-binary transmission apparatus as claimed in claim 9, further comprising a driving amplifier for amplifying the 3-level signal for use as a driving signal of the optical modulator.

12. A method for duo-binary encoding comprising the steps of:
(a) judging with a judgment unit whether an odd or even number of '0's exists in data input signals of N channels;
(b) toggling an output signal of the judgment unit when a number of '0's is even;
(c) determining with an intermediate signal generation unit whether phases of channels other than the N channels are shifted or not, according to an data input signal on the basis of a predetermined channel of the N channels; and
(d) dividing data with a phase division unit into a first data group having non-shifted phases and a second group of data that require a phase shift, according to an output signal of the intermediate signal generation unit and the data input signal, and outputting the divided first and second data groups.

13. The method according to claim 12, wherein in step (c) the intermediate signal generation unit inverts an output signal of the toggle unit to exclusive or (XOR) the data input signal and the inverted output signal, and then XORs the XORed signal and the data input signal again.

14. The method according to claim 12, wherein the judgment unit in step (a) includes a plurality of exclusive OR (XOR) gates connected to each other in a pyramid arrangement, and wherein the judgment unit outputs '0' or '1' when a total number of '0's in data input signals of the N channels is even.

15. The method according to claim 12, wherein the phase division unit in step (d) includes 2N number of AND gates, and wherein the phase division unit exclusive ors (XORs) N number of intermediate signals, which are generated by the intermediate signal generation unit, and the N number of data input signals.

16. A method for providing an optical duo-binary transmission apparatus comprising: the steps of:
(a) dividing N number of data input signals by an encoder into a first data group having non-shifted phases and a second data group that require a phase shift, by a parallel processing, and outputting the divided first and second data groups;
(b) multiplexing the first data group having non-shifted phases and the second data group which require a phase shift, respectively by a first/second multiplexer;
(c) coupling signals respectively multiplexed by the first/second multiplexer so as to output a 3-level signal;
(d) generating and outputting an optical carrier; and
(e) modulating the optical carrier into an optical duo-binary signal by the 3-level signal from step (c), and outputting the modulated signal.

17. The method according to claim 16, further comprising the step of amplifying the 3-level signal so as to provide a driving signal to drive of optical modulator.

* * * * *